E. R. CUNNINGHAM.
WIRE HANGER.
APPLICATION FILED AUG. 23, 1915.

1,193,521.

Patented Aug. 8, 1916.

Witness:
R. L. Farrington

Inventor
Edward R. Cunningham
By Brown, Nissen & Sprinkle
Attys.

UNITED STATES PATENT OFFICE.

EDWARD ROBERT CUNNINGHAM, OF PORTLAND, OREGON.

WIRE-HANGER.

1,193,521.      Specification of Letters Patent.      Patented Aug. 8, 1916.

Application filed August 23, 1915. Serial No. 46,777.

*To all whom it may concern:*

Be it known that I, EDWARD R. CUNNINGHAM, a citizen of the United States, residing at Portland, in the county of Multnomah and State of Oregon, have invented certain new and useful Improvements in Wire-Hangers, of which the following is a specification.

This invention relates to wire hangers, but more particularly to a trolley wire hanger for catenary suspension trolley wires and that part of the construction which is curved conforming to the curvature of the track.

The principal object of the invention is to provide a new and improved construction, combination and arrangement of parts by means of which the trolley wire in a catenary suspension system may be supported around a curve.

Other objects will appear hereinafter.

Figure 1:
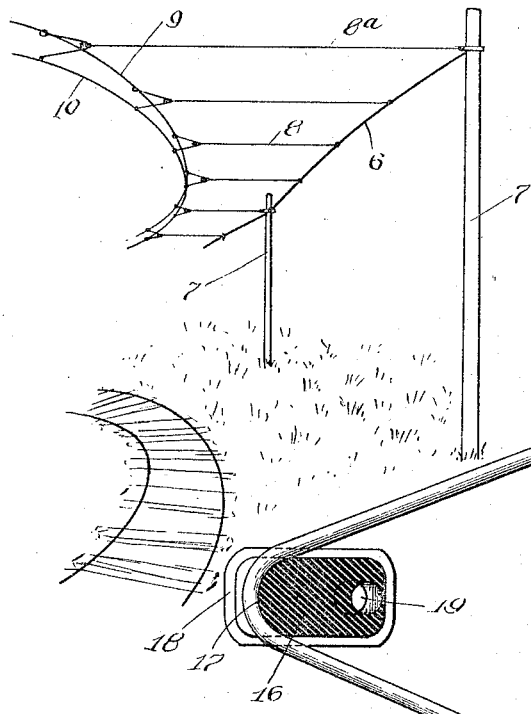
Figure 2:
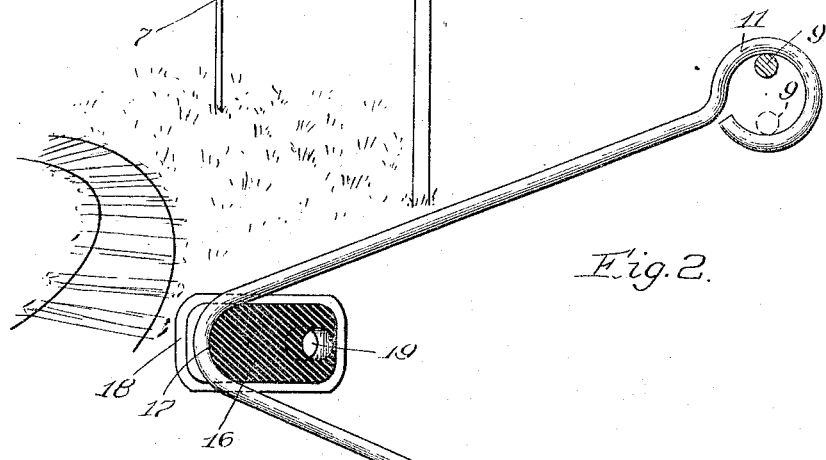
Figure 3:
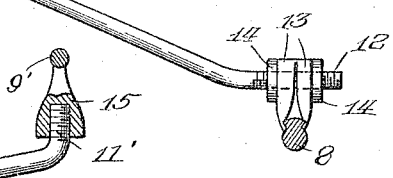
Figure 4:
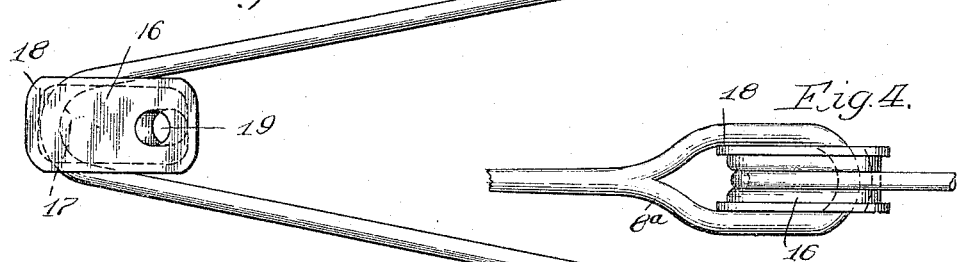

In the accompanying drawing, Figure 1 is a representation of a portion of the curve of the trolley wire system to which my invention is applied; Fig. 2 is a view of the hanger constructed in accordance with the principles of my invention; Fig. 3 is another hanger constructed in accordance with the principles of my invention but having a different connection with the messenger wire, and Fig. 4 is a view of an insulator.

In the catenary suspension system for trolley wires the messenger wire, by means of which the trolley wire is upheld, sags between its supports but by varying the length of the supports the trolley wire supported by the messenger wire can be held at almost an unvarying elevation above the track. The same kinds of supports cannot ordinarily be used on the curves, for of course there is a tendency to draw the trolley wire laterally around the curves so that it is not in vertical alinement with the supporting messenger wire.

The present invention relates to an improved construction, combination and arrangement of elements by means of which the trolley wire and messenger wire may be held in vertical alinement, at the same time permitting of a rising and falling movement of the trolley wire in order to maintain its flexibility and freedom from "hard spots," and at the same time holding the trolley wire at the proper elevation above the track at all times, and particularly when the ordinary electrical collector is not in contact with the trolley wire.

In showing the application of the present device a guy wire 6, as shown in Fig. 1, is secured to fixed supports as poles 7 at the side of a track at the outside of the curve of the catenary suspension system. Span wires $8^a$ are connected at various points along the guy wire and connected to the other end of each of the span wires is a hanger constructed in accordance with the principles of this invention, which has a connection at the top with a messenger wire 9 and a trolley wire 10.

In the form shown by Fig. 2 the hanger comprises a piece of resilient metal bent in the form of a V, one end of which is formed with an eye 11 of such a size that the messenger wire 9 fits loosely therein. The other end of the hanger is formed with a threaded portion 12 to which is secured a trolley wire ear connected to the trolley wire 8. In the form shown by Fig. 2 this trolley wire ear consists of clamping members 13 held in place by nuts 14. In the form illustrated by Fig. 3 each end of the hanger is threaded, one extremity 11' being threaded into an ear 15 secured to a messenger wire 9', and the other extremity being threaded into an ear 13' secured to a trolley wire 8'.

In either case it is obvious that the trolley wire is resiliently supported by the hanger, and since the hanger is resilient the trolley wire will rise or fall as an electrical collector moves along the trolley wire thus avoiding the so-called "hard spots" which are present in a rigidly supported trolley wire, and thereby preventing crystallization of the trolley wire due to constant bending at the supports. In supporting the trolley wire the hanger is in tension, the weight of the trolley wire tending to separate the extremities of the V. As an electrical collector passes under the trolley wire it may raise the trolley wire until the tension in the hanger is entirely relieved. The eye 11 of the construction shown in Fig. 2 then provides an additional distance through which the trolley wire may be raised freely, as indicated by the dotted outline, before the extremities of the hanger will be compressed. Of course, as soon as the electrical collector passes from beneath the hanger the weight of the trolley wire will cause it to assume its natural position in which the trolley wire will be balanced by the tension in the hanger. Being thus resiliently supported the trolley wire itself is subject to very few serious strains, therefore resulting in an increased life and efficiency in operation.

Each span wire 8ª is connected to the apex of the hanger, and interposed between the span wire and the hanger for the double purpose of insulating and preventing undue wear of the parts is an insulator 16. This insulator is formed at one end with a curved portion 17 substantially conforming to the curvature of the apex of the hanger at the sides of which are projecting flanges 18 to hold the insulator in place, and at the other end of the insulator inside of the apex is a rounded hole 19 through which the span wire is passed. It will be seen that since this insulator practically engages only the apex of a hanger the resilient action of the extremities of the hanger will not be interfered with in any respect whatsoever but will allow a substantially unrestrained movement of the trolley wire with respect to the messenger wire.

It will be seen, furthermore, that with this kind of a hanger it is possible to support a trolley wire resiliently from a messenger wire so that a trolley wire will rise and fall in the ordinary manner as a collector passes under it and that both the messenger wire and the trolley wire are readily held in place by means of a span wire insulated from the hanger.

What I claim is:

1. In a catenary suspension for trolley wires, a single V-shaped member attached directly both to the trolley wires and to the suspension member and forming the only connection between them.

2. In a catenary suspension comprising a messenger wire, a trolley wire, and a resilient V-shaped member directly attached at its ends to the wires.

3. In a catenary suspension for trolley wires, a single piece resilient wire hanger to support and brace both the suspension and trolley wires at a curve forming the sole connection between them.

4. In a catenary suspension for trolley wires, a V-shaped wire hanger directly attached both to the messenger and trolley wires and adapted to be drawn at and by its apex to support the wires at a curve and forming the only connection between them.

5. A wire hanger of the class described consisting of a bent flexible member with two extremities, and means at the bend to insulate it.

6. A wire hanger of the class described comprising a bent member with two extremities, one extremity having means for attachment with the wire to the trolley, and the other extremity having means for attachment to a support.

7. A catenary suspension wire hanger comprising a combination, a messenger wire and a trolley wire, and a bent resilient member having means for attachment to the trolley wire and at the other end to the messenger wire.

8. The combination with a messenger wire and a trolley wire, of a hanger comprising a bent wire attached at its ends to the trolley wire and to the messenger wire, spacing the wires apart and extending at an angle from both of them.

9. The combination with a messenger wire, of a trolley wire supported thereby, a hanger comprising a V-shaped connector constructed of resilient material having one end attached to the trolley wire and the other end connected to the messenger wire.

10. In catenary wire suspension construction for curves, the combination with a messenger wire and a trolley wire, of a hanger comprising a bent resilient member having means for attachment at one end to the trolley wire and at the other end to the messenger wire, and means for engaging the bent portion of the member to hold it substantially at right angles to the wires.

11. The combination with a messenger wire and a trolley wire, of a curve hanger comprising a bent member with means for attachment at one extremity to the trolley wire and at the other extremity to the messenger wire, an insulating means at the bend of the hanger by means of which it may be drawn laterally to hold the wires in position at a curve.

12. The combination with a messenger wire and a trolley wire, of a curve hanger therefor consisting of a piece of bent resilient wire having means at one extremity for attachment to the trolley wire and at the other extremity for attachment to the messenger wire, and an insulator attachable to the hanger at the bend thereof by means of which the trolley and messenger wires may be drawn laterally to support the said wires at a curve.

13. The combination with a trolley wire and a messenger wire, of a curve hanger therefor comprising an angular resilient member having connection at one end with the messenger wire, means for connecting the member at the other end to the trolley wire, and means to engage the member intermediate the ends to allow the resilient action whereby the wires may have motion toward and from each other and to draw the member laterally with respect to the wires.

14. The combination with a messenger wire and a trolley wire, of a curve hanger therefor comprising a bent resilient member connected at one end to the messenger wire, means for connecting the other end to the trolley wire, an insulator adapted to be held in the bend of the resilient member, and a span wire connected to the insulator to hold the member laterally at the same angle to both of the wires.

15. The combination with a messenger wire and a trolley wire, of a catenary curve hanger comprising a bent member having connection at each extremity with one of the wires, a span wire for drawing the hanger laterally, and an insulator interposed between the span wire and the hanger comprising a portion adapted to be seated in the bend of the hanger with an aperture at right angles for the insertion of a span wire.

16. The combination with a messenger wire and a trolley wire, of a curve hanger consisting of a bent resilient member attachable at one end to the messenger wire and means for attachment at the other end to the trolley wire, a span wire for drawing the hanger laterally with respect to the other wires, and an insulator disposed at the bend of the hanger and interposed between the hanger and the span wire having a curved portion with laterally extending flanges between which the bend of the hanger properly conforms to the curved portion of the insulator, and an aperture curved at right angles to the bend of the hanger inside thereof through which the span wire is looped.

17. The combination with a messenger wire and a trolley wire, of a curve hanger therefor comprising a bent member having means at one end for rigid attachment to the trolley wire and an eye at the other end through which the messenger wire passes.

18. The combination with a messenger wire and a trolley wire, of a catenary curve hanger therefor comprising a bent resilient member with an eye through which the messenger wire extends loosely, and means at the other end of the hanger for rigid attachment to a trolley wire.

19. The combination with a messenger wire and a trolley wire, of a catenary curve hanger therefor comprising a bent resilient member having means for attachment to the trolley wire at one end, a span wire connected to the hanger at the bend thereof for drawing it laterally with respect to the other wires, and an eye formed on the other end of the hanger through which the messenger wire extends loosely to permit the trolley wire to rise an additional distance without compressing the hanger.

20. In a catenary suspension for trolley wires a resilient V-shaped wire hanger attached to the messenger and trolley wires and adapted both to support the latter from the former and space the two apart, and to be drawn by its apex to make the wires conform to a desired curve.

21. In a catenary suspension for trolley wires, a V-shaped hanger attached to the messenger and trolley wires to form the only support for the trolley wire below the messenger at a curve, and means to draw the hanger laterally by its apex.

22. In a catenary suspension for trolley wires, a V-shaped hanger consisting of a single piece of wire attached at one end to the messenger wire and at the other end to the trolley wire.

In testimony whereof I have signed my name to this specification, in the presence of two subscribing witnesses, on this 16th day of August, A. D. 1915.

EDWARD ROBERT CUNNINGHAM.

Witnesses:
H. K. RELF,
J. D. FOLEY.

Copies of this patent may be obtained for five cents each, by addressing the "Commissioner of Patents, Washington, D. C."